United States Patent [19]
Appleton et al.

[11] Patent Number: 5,466,147
[45] Date of Patent: Nov. 14, 1995

[54] APPARATUS FOR MOLDING LENSES

[75] Inventors: William J. Appleton; Dennis Hahn, both of Rochester; William E. Moucha, Bergen; Dominic V. Ruscio, Webster; John H. Shannon, Hamlin; Steven D. Silbermann, Rochester; Edwin W. Weaver, Jr., Caledonia, all of N.Y.

[73] Assignee: Bausch & Lomb Incorporated, Rochester, N.Y.

[21] Appl. No.: 128,930

[22] Filed: Sep. 29, 1993

Related U.S. Application Data

[62] Division of Ser. No. 758,046, Sep. 12, 1991, Pat. No. 5,271,875.

[51] Int. Cl.$^6$ .............................. B29C 39/28; B29C 39/40
[52] U.S. Cl. .............................. 425/412; 249/82; 249/134; 249/160; 425/808
[58] Field of Search .............................. 425/412, 808; 249/82, 117, 134, 160; 264/2.3, 2.6, 2.2

[56] References Cited

U.S. PATENT DOCUMENTS

| | | | |
|---|---|---|---|
| 4,113,224 | 9/1978 | Clark et al. | 425/808 |
| 4,121,896 | 10/1978 | Shepherd | 425/412 |
| 4,197,266 | 4/1980 | Clark | 264/2.2 |
| 4,209,289 | 6/1980 | Newcomb et al. | 264/2.2 |
| 4,211,384 | 7/1980 | Bourset et al. | 249/160 |
| 4,407,766 | 10/1983 | Haardt et al. | 264/2.2 |
| 4,565,348 | 1/1986 | Larsen | 249/122 |
| 4,761,069 | 8/1988 | Truong et al. | 351/160 H |
| 4,865,779 | 9/1989 | Ihn | 264/1.1 |
| 4,955,580 | 9/1990 | Seden et al. | 249/82 |
| 5,076,683 | 12/1991 | Glick | 351/160 H |
| 5,158,718 | 10/1992 | Thakrar et al. | 264/2.3 |
| 5,238,388 | 8/1993 | Tsai | 425/808 |
| 5,252,056 | 10/1993 | Hörner et al. | 425/808 |
| 5,264,161 | 11/1993 | Druskis et al. | 264/2.3 |

FOREIGN PATENT DOCUMENTS

| | | |
|---|---|---|
| 2038283 | 9/1991 | Canada. |
| 0064381 | 11/1982 | European Pat. Off.. |
| 367513 | 5/1990 | European Pat. Off.. |
| 0383425 | 8/1990 | European Pat. Off.. |
| 2270082 | 12/1975 | France. |
| 2402525 | 9/1978 | France. |
| 2565160 | 6/1984 | France. |
| 2230730 | 10/1990 | United Kingdom .......... 425/808 |
| 2235408 | 3/1991 | United Kingdom. |

*Primary Examiner*—Robert B. Davis
*Attorney, Agent, or Firm*—Craig E. Larson; Katherine H. McGuire; Denis A. Polyn

[57] ABSTRACT

A mold assembly includes first and second mold sections having respective first and second mold cavity defining surfaces, the first mold cavity defining surface terminating in an encircling peripheral rim and the second mold cavity defining surface terminating in a deformable peripheral annulus disposed at a diameter corresponding to the rim, and cooperating tapers depending from each of the first and second molds for relatively centering the molds.

40 Claims, 10 Drawing Sheets

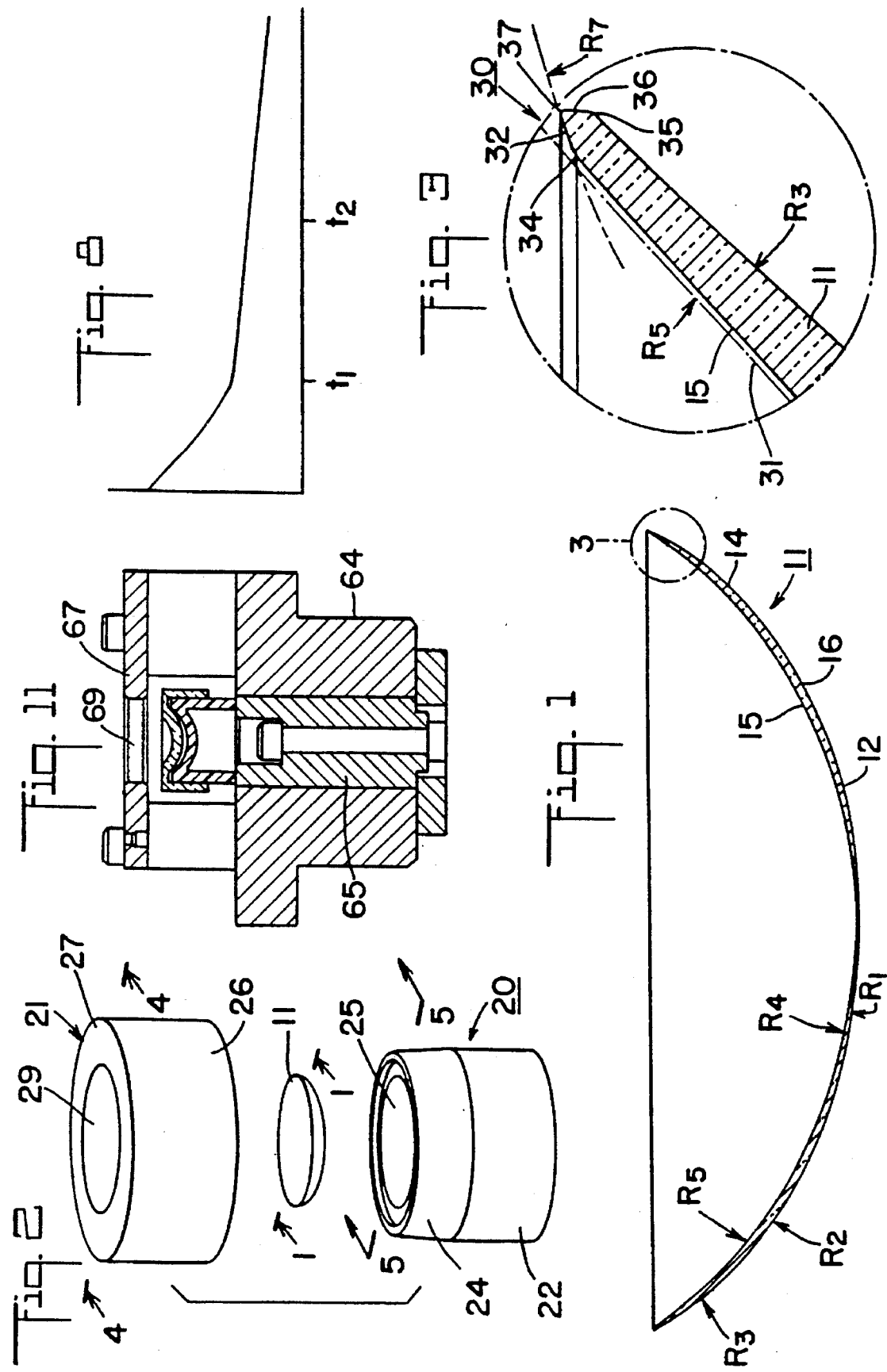

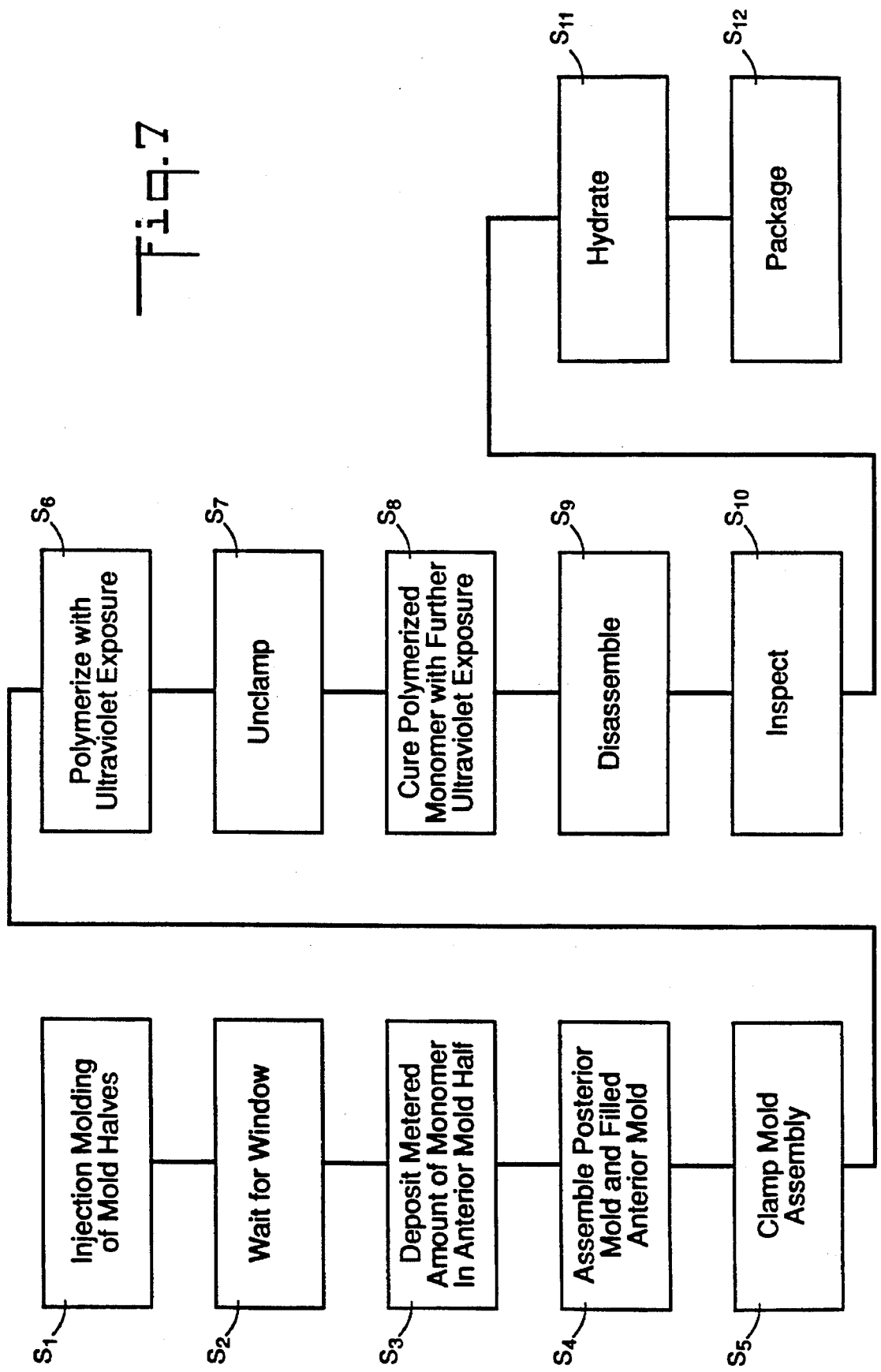

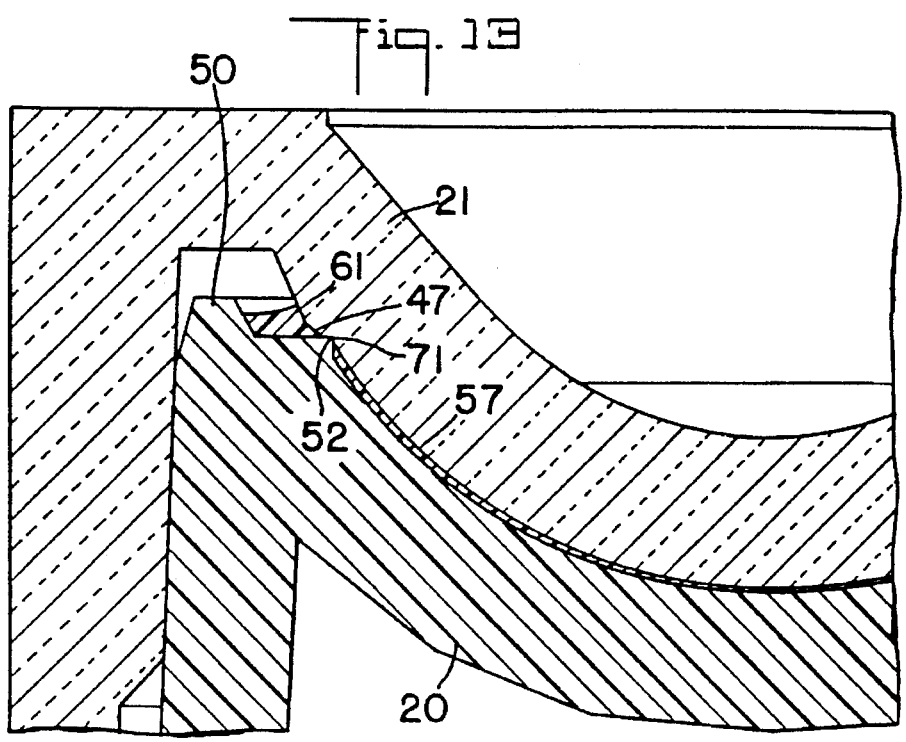
Fig. 13
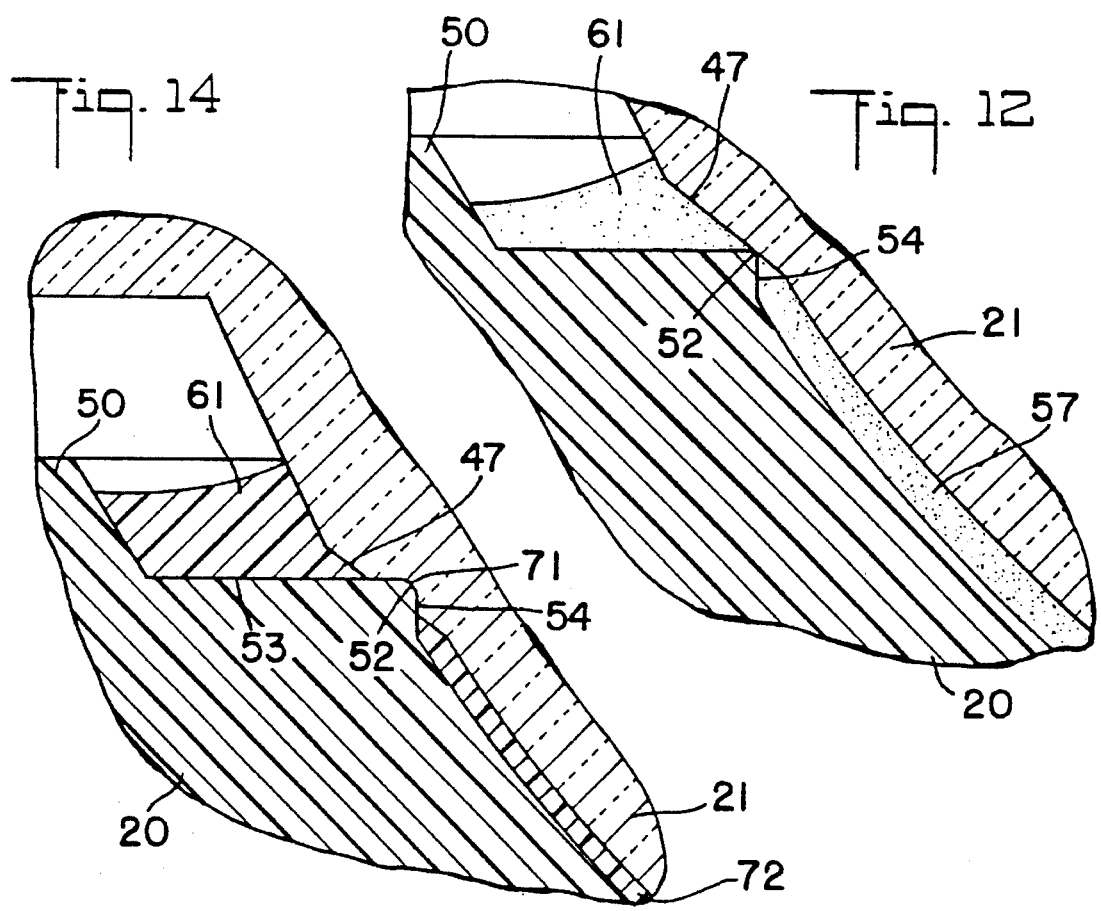
Fig. 14
Fig. 12

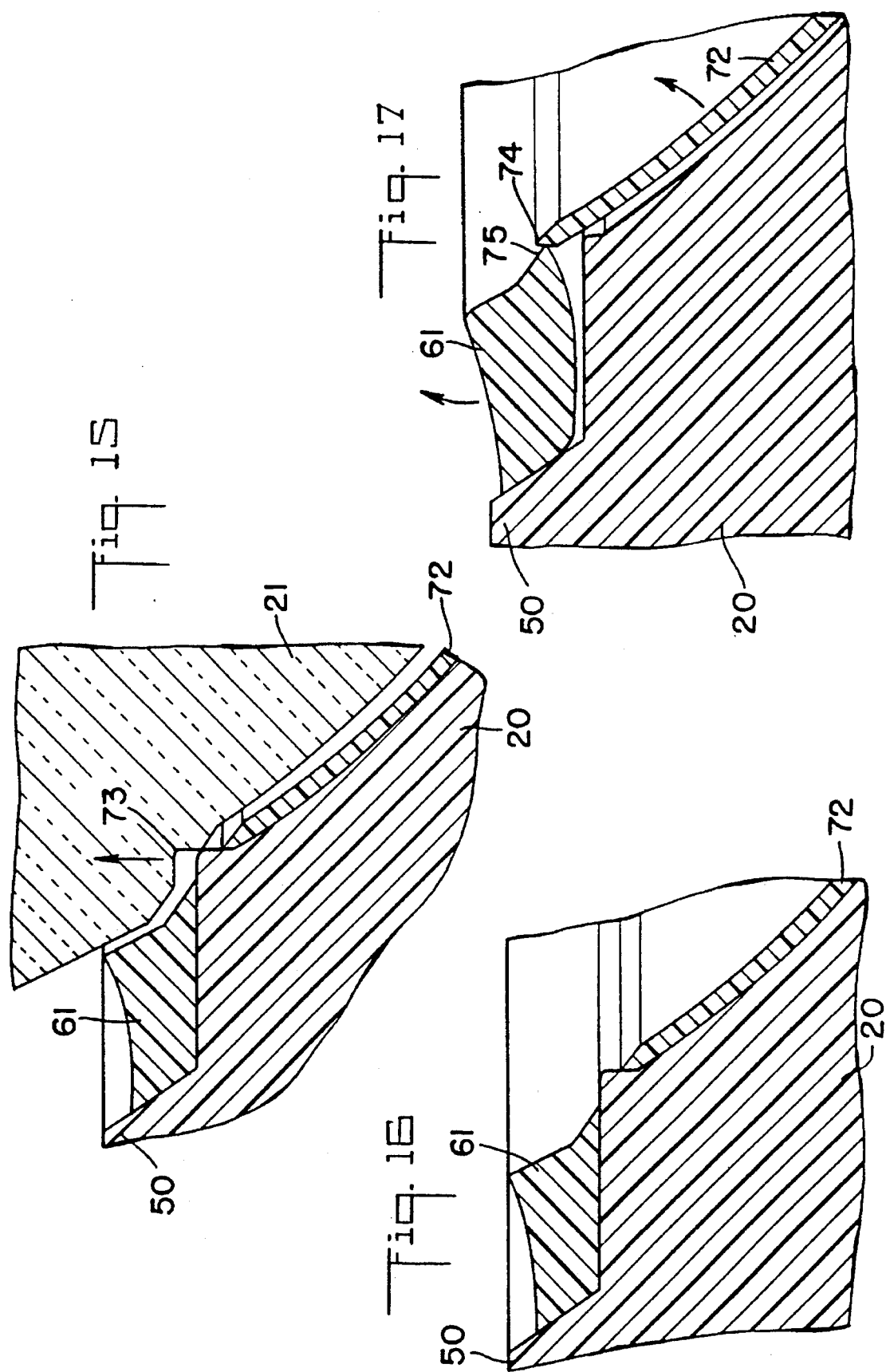

APPARATUS FOR MOLDING LENSES

This is a divisional of application Ser. No. 07/758,046 filed on Sep. 12, 1991, and now U.S. Pat. No. 5,271,875.

BACKGROUND OF THE INVENTION

1. Field of the Invention

The present invention pertains to a method and apparatus for molding lenses, and particularly to a method and apparatus for molding lenses such as contact lenses which have a finished edge and which are suitable for wearing directly on the eye.

2. Description of the Related Art

It has become desirable to form lenses, particularly contact lenses but also other types of lenses, by molding such lenses rather than by lathing or by other processes. Molded lenses are desirable for several reasons. For example, it is possible to produce such lenses with great repeatability—to produce many lenses which have the same shape and optical characteristics. Moreover, a molded lens can be formed to any desired shape, subject only to producibility constraints of the mold.

In general, molded lenses are formed by depositing a curable liquid such as a polymerizable monomer into a mold cavity, curing the liquid into a solid state, opening the mold cavity and removing the lens. Other processing steps, for example, hydration, may also be performed. In any event, as the lens material transitions from its liquid or semi-liquid state to a solid or semi-solid state, the material shrinks. For example, when the lens material is a polymerizable monomer such as hydroxyethyl methacrylate ("HEMA"), about 15% to 25% volume reduction can be expected as the material cures.

Material shrinkage is of considerable concern and must be accommodated during molding. If shrinkage is not properly accommodated, it is possible for the curing lens material to pull away from its associated mold surface. Any such separation produces unacceptable optical surfaces and resutls in an unusable lens. And even if separation does not occur, internal stresses often produce unacceptable distortion of the lens.

Because of the problem of lens material shrinkage during curing, it has heretofore been difficult to provide acceptable molded lenses that do not require additional finishing steps. Conventional molding techniques, such as described in Larsen U.S. Pat. No. 4,565,348, accommodate shrinkage with mold halves which flex during curing. Such techniques may have unacceptable repeatability due to unpredictable deformation in mold shape during curing. In particular, because the lens shape is defined by a mold half that flexes during curing, the radii that define the optical power of the lens can change unpredictably making it difficult to produce lenses repeatably.

The geometry of contact lenses makes the problems associated with shrinkage even more acute. FIG. 1 is cross-sectional view of a contact lens 11 which, as shown there, includes a central optical zone 12 and a peripheral carrier zone 14. Typically, the optical zone 12 is 7 mm–11 mm in diameter and the overall diameter of the lens 11 is 13 mm–15 mm. As seen in FIG. 1, the lens is formed in distinct radius zones on both the posterior side 15 and the anterior side 16. Thus, from the central optical zone 12 outward, anterior side 16 is formed first with radius R1, which is selected in accordance with desired optical power of the lens, merges into radius R2 in the carrier zone 14 of the lens, and then merges into radius R3 selected to provide a suitable transition to the edge taper. On the posterior side 15, the optical zone 12 is formed with radius R4 which is also selected in accordance with the desired optical power of the lens, and which merges with radius R5 in the carrier zone 14 of the lens.

In consequence of this configuration, lens 11 is formed with substantially greater volume of material in the peripheral carrier zone 14 than in the central optical zone 12. That is, whether the optical zone 12 provides positive or negative optical power, because carrier zone 14 surrounds optical zone 12 at a greater diameter, there is more material in the carrier zone. Consequently, there is significantly more shrinkage that must be accommodated in the peripheral portion of the lens than there is in the central portion thereof, and the lens material therefore shrinks nonuniformly.

Conventional molding techniques, such as described in the above-mentioned Larsen U.S. Pat. No. 4,565,348, do not compensate satisfactorily for this nonuniform shrinkage. The flexible molds provide their greatest compensation in the middle of the mold cavity and provide no compensation at the periphery of the mold where the greatest shrinkage, as described above, occurs.

It has also been considered to accommodate shrinkage by providing a reservoir of suitable polymerizable monomer at the peripheral region of the mold cavity. See U.S. Pat. Nos. 4,113,224 and 4,197,266. In principle, during polymerization, the shrinking monomer will draw additional monomer in from the reservoir. In practice, this configuration has not been found satisfactory inasmuch as it is difficult to mold a finished edge into the lens, and such a lens therefore inevitably requires subsequent machining and lathing processes. Moreover, because the most shrinkage occurs after the lens material gels, reservoir techniques are of limited effectiveness.

SUMMARY OF THE INVENTION

In one aspect of the invention, the drawbacks associated with the prior art are addressed through the provision of a mold assembly and a method of using the same, the assembly comprising first and second mold sections having respective first and second mold cavity defining surfaces, the first mold cavity defining surface terminating in an encircling peripheral rim, the second mold cavity defining surface terminating in a deformable peripheral mating surface disposed at a diameter corresponding to that of the peripheral rim, and centering means for the respective first and second mold sections. The mold cavity may be formed such that it includes a central optical zone and a peripheral carrier zone that has a substantially greater volume than the optical zone. The mating surface is an annulus which is reversely angled with respect to the second mold cavity defining surface. By the term "reversely angled" it is meant that the mating surface angles outwardly, away from the second mold cavity defining surface and toward the first mold cavity defining surface. The annulus may be flat or it may be radiused such that it resembles a section of a torus.

The first and second mold sections may be formed of different materials which have different affinity to cured lens material. This is advantageous in that the molded lens will preferentially remain on one of the mold sections after separation of the mold assembly. Selection of differing materials for the mold sections may also desirably affect the surface properties of the cured lens.

In another aspect, the invention provides for a posterior mold and a method of using the same, the mold preferably having a generally spherical mold cavity defining surface provided at the periphery thereof a reversely angled deformable mating surface adapted to mate with a lens edge-defining rim of an anterior mold. The posterior mold's mating surface may be formed in the shape of an annulus, the annulus being reversely angled with respect to the mold cavity defining surface. The annulus may be radiused such that it resembles a section of a torus, and the posterior mold may be provided with centering means depending from the mating surface for providing accurate alignment for the anterior mold, and a pressure receiving surface for receiving clamping pressure during the curing of lens material.

In another aspect of the invention, the invention provides for an anterior mold and a method of using the same, the mold having a generally spherical mold cavity defining surface provided at the periphery thereof with a rim. A collar preferably surrounds the rim so as to form a receptacle for confining excess lens material and centering means for centering a posterior mold may depend from the collar. The rim may be defined as the corner of a right cylindrical wall in the mold cavity defining surface and a radially extending flange between the collar and the mold cavity defining surface.

This brief summary of the invention has been provided so that the nature of the invention may be understood quickly. Embodiments of the invention are described below in significant detail in connection with the attached drawings which together form a complete part of this specification.

BRIEF DESCRIPTION OF THE DRAWINGS

FIG. 1 is cross-sectional view of a contact lens;

FIG. 2 is a perspective exploded view of a mold assembly including a contact lens;

FIG. 3 is a magnified view of a contact lens edge;

FIG. 7 is a flow diagram useful for explaining a lens molding method according to the invention;

FIG. 8 is a graph for explaining dimensional stability of mold materials;

FIG. 11 is a diagrammatic cross-sectional view of a clamping apparatus for the assembled mold sections;

FIG. 12 is a magnified view showing edge details of assembled mold sections under clamping pressure.

FIG. 13 is a expanded cross-sectional view of assembled mold sections after curing;

FIG. 14 is a magnified view showing edge details of assembled mold sections after curing;

FIGS. 15 through 17 are views for explaining mold disassembly and lens extraction;

DETAILED DESCRIPTION OF THE PREFERRED EMBODIMENTS

Figure 4:
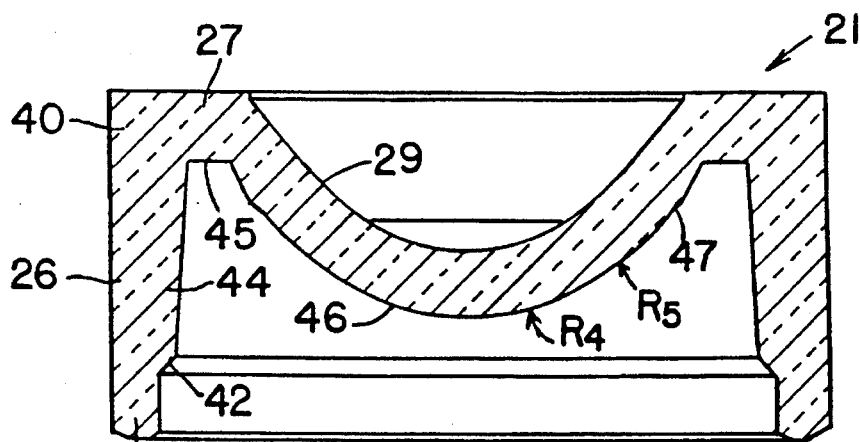
FIG. 4 is a cross-sectional view of a posterior mold section.

FIG. 2 shows the overall configuration of an anterior mold section 20 relative to a posterior mold section 21.

As shown there, anterior mold 20 includes a cylindrical base 22 which blends into a tapered head 24. The tapered head serves as centering means to center the anterior mold 20 within a complementarily shaped taper in posterior mold 21. The anterior mold also includes an anterior mold cavity defining surface 25 formed to provide the desired radii R1 through R3 shown in FIG. 1. Advantageously, with this construction the tapered head which serves as centering means and the mold cavity defining surface are close to each other, thereby providing the greatest centering effect without the intervention of superfluous structure.

Posterior mold 21 includes a cylindrical shell 26 dimensioned to allow posterior mold 20 to fit complementary shaped centering means within the shell. Top flat 27 is provided to receive clamping pressure and to distribute it uniformly to the assembled mold. Posterior mold 21 includes a posterior mold cavity defining surface, the reverse side of which is indicated at 29, which defines radii R4 and R5 in FIG. 1. As before, the centering means for posterior mold 20 are close to the mold cavity defining surface to provide the greatest centering effect.

The posterior and anterior mold cavity defining surfaces are formed so as to provide the desired edge structure for contact lens 11. The edge structure for lens 11, as shown in FIG. 3, includes a tapered edge 30 which ensures that there are not sharp or irritating edges that contact either the eye or the interior surface of the eyelid. In particular, tapered edge 30 includes a reversely angled lip 32 which is contoured away from the eye, the surface of which is indicated schematically at 31. Lip 32 may be radiused, for example, as shown by dotted line R7 in FIG. 3, or lip 32 may be flat. In any event, the junction between lip 32 and the posterior side 15 of lens 11 is rounded for comfort as shown at 34.

The anterior portion of tapered edge 30 includes corner 35 that again is rounded for comfort relative to the interior surface of the eyelid. The corner merges into vertical wall 36 which meets lip 32 at tip 37. By virtue of this structure, tip 37 is not in contact with either the eye or the interior surface of the eyelid, thereby maximizing wearer comfort.

Figure 5:
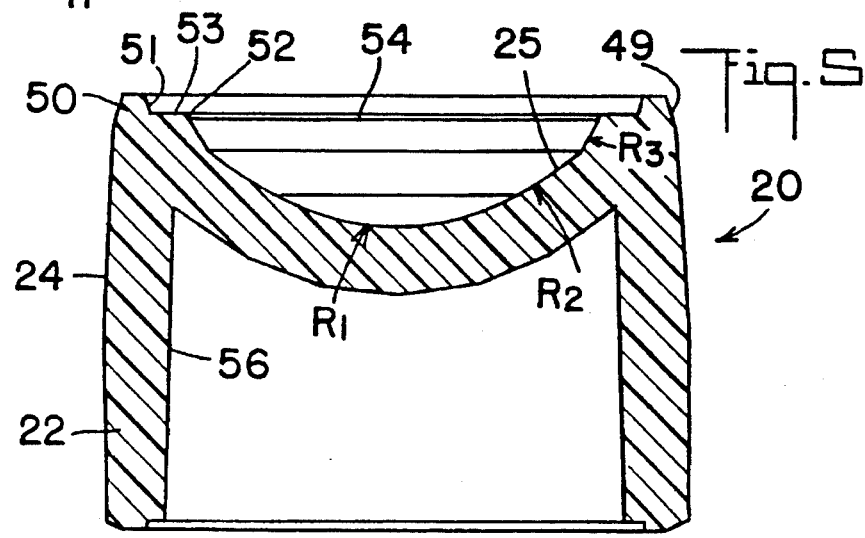
FIG. 5 is a cross-sectional view of an anterior mold section.

FIGS. 4 and 5 show an expanded view of the anterior and posterior molds which provide for this edge structure. As shown in FIG. 4, and as previously mentioned, posterior mold 21 includes cylindrical shell 26, top flat 27 and reverse side 29 of the posterior mold cavity defining surface. The thickness of the posterior mold is selected to be sufficient so that the mold cavity defining surface is rigid and does not deform under curing or polymerizing stress. The cylindrical shell 26 is joined to top flat 27 at shoulder 40. Posterior mold 21 further includes a base 41 which is relatively thinner than the remainder of the mold to provide an interior diameter that is larger than that defined by the remainder of the mold, thereby facilitating access for anterior mold 20. Base 41 includes a stepped diameter 42 which leads into taper 44. Taper 44 provides centering means for alignment and centering of anterior mold 20 with respect to posterior mold 21.

Taper 44 reverses at 45 and leads to posterior mold cavity defining surface 46 having a generally spherical surface. "Generally spherical" is understood to include shapes which are not strictly spherical such as aspheric or toric shapes. As shown in FIG. 4, surface 46 is shaped with required radii R4 and R5 (FIG. 1) for the central optical zone and the peripheral carrier zone, respectively. At the periphery of mold cavity defining surface 46 is a mating surface formed from an annulus 47 which corresponds to lip 32 shown in FIG. 3. This surface may be flat or radiused as previously described. The annulus 47 is reversely angled relative to the mold cavity defining surface 46 and thereby permits formation of lip 32 so that it is away from the eye and smooth at its junction with mold cavity defining surface 46.

FIG. 5 shows anterior mold 20 which, as previously described, includes cylindrical base 22, tapered head 24, and "generally spherical" (as defined above) anterior mold cavity defining surface 25. Surface 25 is shaped with radii R1, R2 and R3 (FIG. 1) for the central optical zone and peripheral carrier zone, respectively. The diameter of taper 24 is selected so that it is slightly smaller than the corresponding diameter of taper 44 in posterior mold 21. This ensures that the mold sections seat without interference while also ensuring that they are properly centered. Preferably, the molds seat with a 0 to 20 micron clearance between tapers 24 and 44, more preferably with a 10 micron clearance.

Taper 24 leads to a collar 50 which forms an inwardly sloping area 49 and a receptacle in area 51. The inwardly sloping area 49 interacts with the stepped diameters of posterior mold 21 to facilitate assembly. A sharp rim 52 encircles the periphery of mold cavity defining surface 25, the rim 52 being formed by the corner junction of right cylindrical wall 54 that corresponds to vertical wall 36 in FIG. 3 and radially extending flange 53 that leads from collar 50.

Reverse surface 56 of the anterior mold generally follows the contours of the above described surfaces. The thickness of anterior mold 20 is selected so that it is sufficient to prevent flexing of the mold cavity defining surface under polymerizing or curing stress.

Figure 6:
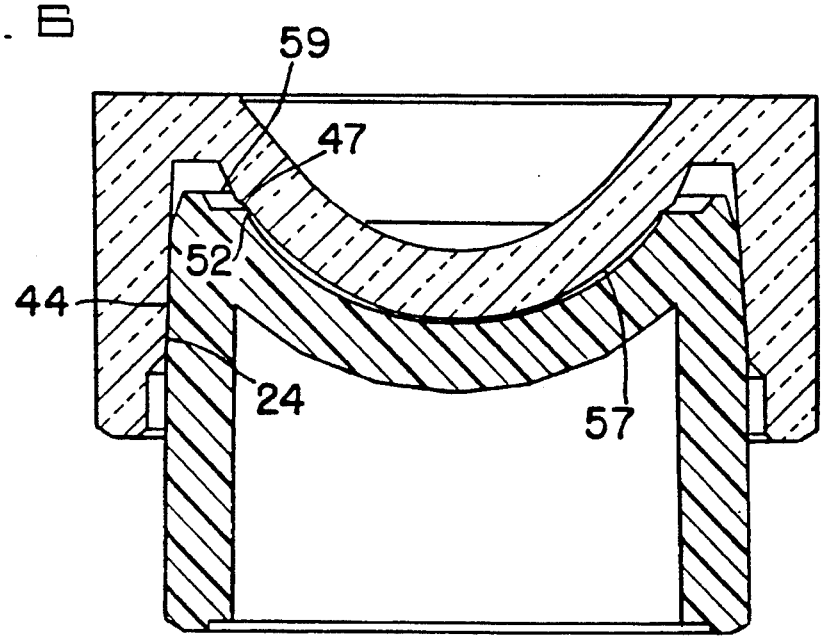
FIG. 6 is a cross-sectional view of a posterior mold section assembled with an anterior mold section.

FIG. 6 diagrammatically illustrates posterior mold 21 and anterior mold 20 in their assembled form. As shown in FIG. 6, posterior mold 21 seats snugly against anterior mold 20 such that rim 52 seats against annulus 47. Tapers 44 and 24 meet with the above-noted clearance so as to center the anterior and posterior molds thereby to prevent prism or other undesired defects caused by decentering. As so assembled, the mold sections form mold cavity 57 in which curable lens material such as polymerizable HEMA is held during curing.

As assembled, the molds also form receptacle 59 in area 51 behind collar 50. Receptacle 59 is provided to receive excess lens material that is ejected from mold cavity 57 when the molds are seated. Any such excess material is retained in receptacle 59 where it is prevented from reaching the junction between tapers 24 and 44. If excess lens material reaches that junction, it has been found that capillary action undesirably causes the excess material to be wicked from receptacle 59. Until mold cavity 57 is sealed as described below, there is the potential for lens material also to be wicked from within mold cavity 57. Collar 50 prevents this.

The materials for posterior mold 21 and anterior mold 20 should be selected in consideration of their relative deformability and their affinity for cured lens material. In particular, during curing, it is desired for annulus 47 and rim 52 to deform each other, and the relative deformability of these two surfaces should be selected accordingly. It has been found that a combination of polypropylene (e.g., MARLEX from Phillips 66) for posterior mold 21 and rigid (unplasticized) polyvinyl chloride (e.g., GEON from B.F. Goodrich) for anterior mold 20 provides a suitable combination of materials such that annulus 47 and rim 52 may be relatively deformed during curing. Other materials may be used, for example ionomer, polyarylsulfone, polyetherimide, polyester, polystyrene, rubber modified copolymer or rigid polyurethane, and the same material may be used for both the anterior and posterior mold although it is preferable to use different materials. In terms of hardness, the posterior mold material should range from approximately Shore D 50 to Rockwell M 110, preferably from Shore D 65 to Rockwell M 65. (Polypropylene is approximately Shore D 75.) The anterior mold material should range from approximately Shore D 70 to Rockwell M 120, preferably from Shore D 80 to Rockwell M 110. (PVC is approximately Shore D 87).

The selection of polypropylene and PVC for the posterior and anterior mold, respectively, is also advantageous in that these materials provide rigid mold cavity defining surfaces which eliminate the adverse effects of optical zone deformation during curing. This ensures that lenses produced by the molds have predictable characteristics and are repeatable from mold-to-mold.

It has also been found that when HEMA is used for lens material, cured lens material has greater affinity for the PVC of anterior mold 20 than for the polypropylene of posterior mold 21. Thus, the combination of PVC and polypropylene is advantageous in that it ensures that the cured lens remains in the anterior mold where removal, for example, by hydration, is more readily achieved.

Finally, it is noted that polypropylene transmits ultraviolet light which is a commonly used medium for initiating curing or polymerization.

Because the molds are designed such that rim 52 and peripheral annulus 47 relatively deform each other, the molds are preferably used one time and one time only. The molds may be fabricated through standard injection molding techniques such as are conventional to those skilled in the art.

FIG. 7 is flow diagram for explaining a method for molding lenses according to the present invention.

In step S1, the anterior and posterior molds are formed, conveniently through injection molding as described above. Molds so formed, especially of the polypropylene material mentioned above, are especially prone to dimensional instabilities that are significant to the optical tolerances that must be maintained in the practice of the invention. For example, as shown in FIG. 8, during an initial period after injection molding until a time t1, the molds are subject to thermal and other dimensional distortions which cause their dimensions to change dramatically. The molds are not usable during this period. During the period after t1, the molds continue dimensional change, but at a much slower rate. It has been found desirable to use the molds within a range of time determined by dimensional operating tolerances. This is represented in FIG. 8 by the period between t1 and t2. Typically, for polypropylene, t1 is about one hour and t2 is about four hours.

Thus, returning to FIG. 7, step S2 indicates a delay period during which the molds are not used until a window between t1 and t2. Then, in step S3 a predetermined or metered amount of lens material, in this case, HEMA, is deposited in the anterior mold. The amount of lens material deposited in the mold is calculated to accommodate any dimensional tolerances involved in the fabrication of the molds, any variation in the metering capabilities of the metering pump, and other effects. In addition, a slightly greater amount of lens material than that calculated above is deposited. The excess amount of lens material is provided to ensure that a small amount of excess is formed along the periphery of the assembled mold cavity. The excess lens material ensures that no bubbles or other edge defects are formed in the edge region of the lens when the lens cavity 57 seals.

Figure 9:
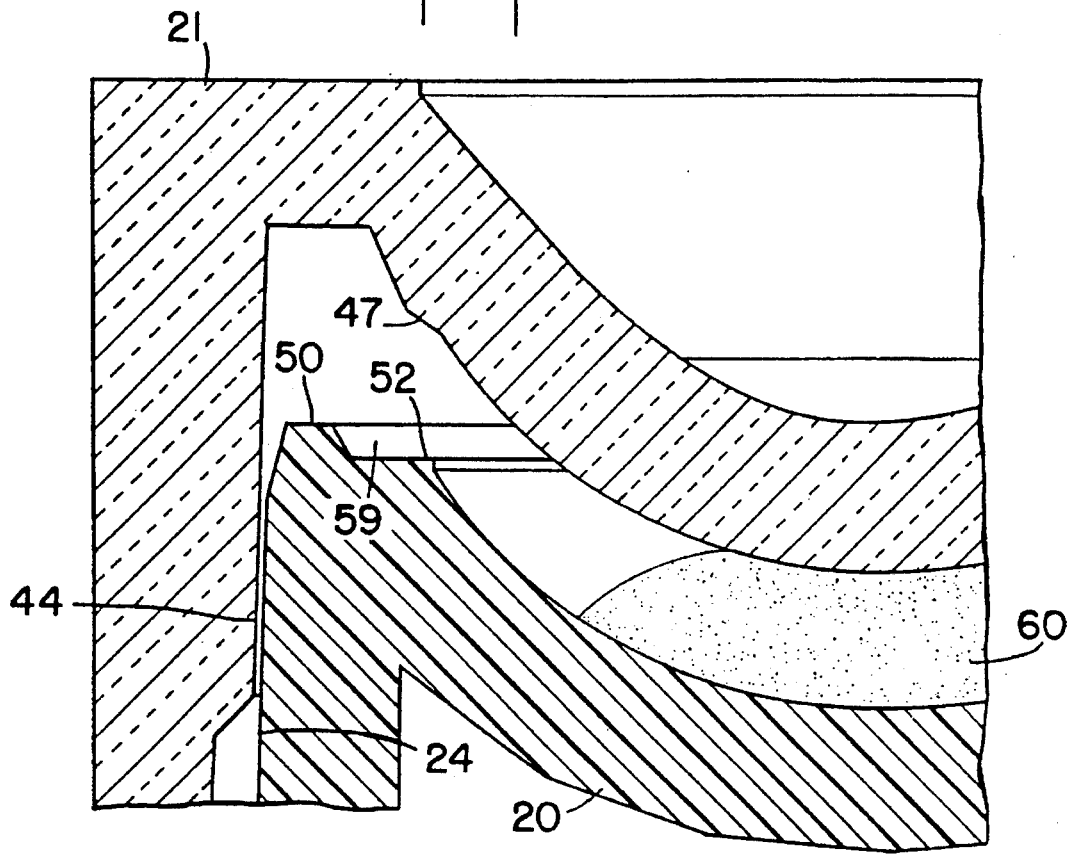
FIG. 9 is an expanded cross-sectional view of mold sections being assembled to show the position of lens material.
Figure 10:
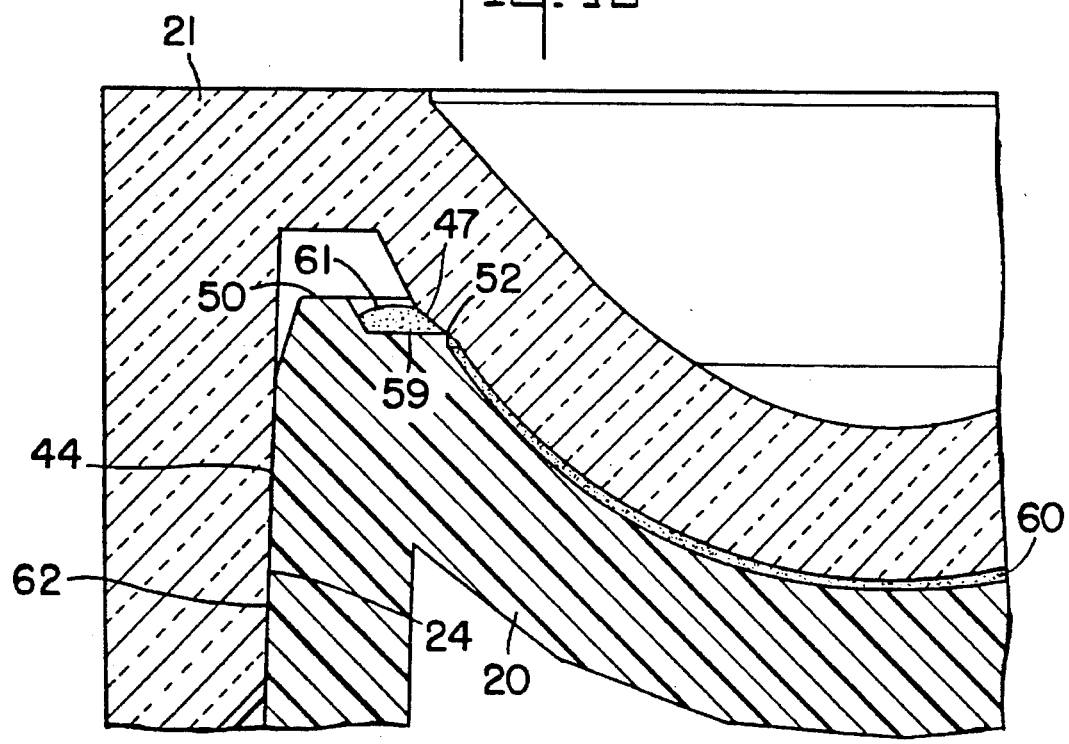
FIG. 10 is a cross-sectional view of assembled mold sections for showing the formation of a receptacle for excess lens material.

In step S4, the posterior mold is assembled and seated against the anterior mold, as shown in FIGS. 9 and 10. As shown in FIG. 9, the mold sections may at first move towards each other relatively quickly, facilitated by interaction between the stepped diameters in posterior mold 21 and angled surface 49 in anterior mold 20. As the posterior mold cavity defining surface approaches the lens material 60 that has been deposited in the anterior mold, the molds should be moved together at very low speeds to ensure that lens material 60 wets the entire surfaces of the anterior and posterior mold cavity defining surfaces without the formation or introduction of bubbles or other defects. Movement of the two molds continues until rim 52 seats against annulus 47, as shown in FIG. 10. Tapers 24 and 44 function to center the two mold sections relative to each other. Excess lens material 61 is deposited into receptacle 59 where collar 50 prevents excess material from flowing between surfaces 24 and 44.

In step S5, the mold assembly is clamped. A suitable clamping structure is shown schematically in FIG. 11. As seen there, the clamping structure includes a base 64, a piston 65, and an upper plate 67. The upper plate includes port 69 through which ultraviolet radiation may be projected to cure lens material 60. Port 69 is of a diameter suitable to expose not only lens material in mold cavity 57 but also excess lens material 61 in receptacle 59.

The assembled anterior and posterior molds are placed on piston 65, after which an unshown air cylinder slides the piston up to clamp the flat 27 against the upper plate 67, thereby to subject the assembled mold to a predetermined clamping force. An air cylinder is preferably used for this purpose so that the clamp force remains substantially the same regardless of the amount of subsequent movement, particularly during curing, between the anterior and posterior molds.

The force with which the mold assembly is clamped is selected so that rim 52 seats against annulus 47 in a continuous line around the edge of the mold cavity to form a fluid-tight seal. The clamp force should be selected so that it is large enough to ensure that such a seal is achieved without any gaps, but so that it is small enough that annulus 47 and rim 52 are not deformed excessively under the force. Excessive deformation at this pre-cure stage reduces the amount of further deformation available to a level below that necessary to accommodate shrinkage during curing. With the above mentioned polypropylene/PVC combination, it has been found that 20–40 pounds of clamping force is preferable.

FIG. 12 shows the condition of the anterior mold, the posterior mold, the lens material in mold cavity 57 and the lens material in receptacle 59 as a result of clamping by the FIG. 11 structure. As seen there, rim 52 seals against annulus 47 but neither rim 52 nor annulus 47 has been significantly deformed. Mold cavity 57 is effectively sealed from receptacle 59 and excess monomer 61 in receptacle 59 is contained within the receptacle by the action of collar 50.

Returning to FIG. 7, in step S6 the lens material is cured from its liquid or semi-liquid state to its solid or semi-solid state. In the particular embodiment described here, such curing is achieved through polymerization of polymerizable HEMA monomer in a nitrogen atmosphere with the assistance of ultraviolet exposure through port 69 in the clamping assembly. Other curing techniques are also possible, for example thermal curing.

As mentioned above, polypropylene plastic used for the posterior mold 21 transmits ultraviolet irradiation and thus effectively permits curing of the lens material contained both in receptacle 59 and in mold cavity 57. To ensure sufficient curing of polymerizable HEMA monomer, ultraviolet irradiation continues for approximately five minutes under clamping pressure, the mold is unclamped (step S7), and further polymerization to remove residual unreacted constituents is obtained through five further minutes of ultraviolet exposure (step S8). Cure times will vary depending on the particular monomer mix employed, as will be apparent to one of ordinary skill in the art.

FIG. 13 shows the mold assembly after curing. As seen there, rim 52 and annulus 47 have relatively deformed each other. In particular, rim 52 has deformed the surface of annulus 47 as shown at 71 and annulus 47 has rounded the edge of rim 52 as also shown at 71. As shown conceptually in FIG. 14, rim 52 has embedded itself into annulus 47 to the extent that after curing the original height of vertical wall 54 has been approximately halved. In a specific example, the original height of wall 54 is approximately 50 microns, and the undistorted height after curing is approximately 25 microns. The indentation in annulus 47 was about 5 microns. Calculations have shown that this degree of deformation is sufficient to accommodate substantially all shrinkage expected for the lens material entrained in mold cavity 57.

In step S9, the posterior and anterior molded surfaces are disassembled. As shown in FIG. 15, this is preferably performed by a strictly vertical motion without any angular or a lateral translational motion so as to prevent damage to the cured lens 72. As further shown in FIG. 15, because the cured lens material has greater affinity for anterior mold 20, cured lens 72 as well as cured excess lens material 61 remains with the anterior mold.

As further shown in FIG. 15, because the deformation of annulus 47 is plastic deformation it results in a permanent scoring 73 along a middle circumference of the annulus. Similarly, rim 52 remains permanently rounded. It is for these reasons that the molds are preferably used once only.

In step S10, the lens is subjected to inspection. During such an inspection, it is possible to determine if foreign materials or bubbles were retained in mold cavity 27 during the molding process, or if any other contaminants or undesirable features of the lens have been obtained.

In step S11, the lens is hydrated to facilitate removal from the mold. During hydration, as shown in FIG. 17, the cured lens material expands from a somewhat shrunken state as depicted in FIG. 16 as it absorbs water. Because of this expansion, edge 74 of the cured lens interacts with edge 75 of the cured excess 61. To ensure that pieces of material do not chip away from these edges and contaminate the finished lens, a surfactant is normally added to the hydrating fluid. A suitable surfactant is polyoxyethylenesorbitan-20 monoleate (TWEEN-80) added at a rate of 0.5% by weight to a hydrating fluid consisting of distilled or purified water. Hydration preferably occurs at an elevated temperature, for example, between 30° C. and 100° C.

In step S12, the finished lens is packaged. During packaging, additional steps may also be performed, for example, further optical inspection steps, sterilization, grading, addition of tint or coloring, etc.

It is, of course, possible to interchange several of the steps described above. For example, the inspection of step S10 can be performed at a later point or eliminated altogether. In addition, it is possible to demold the lens before hydration in a so-called "dry release" step. In this step, care must be exercised to ensure that the cured excess material 61 does not interfere with the demolding process, and to ensure that the lens is not damaged during release.

Figure 18:
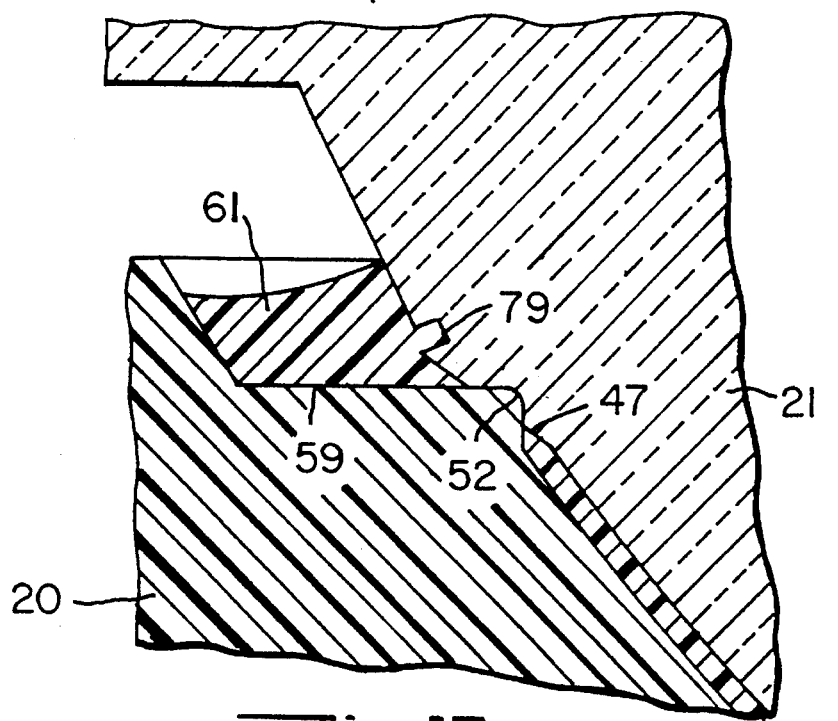
FIGS. 18 and 19 are views for explaining an alternative embodiment of a posterior mold section which retains excess polymerized monomer.
Figure 19:
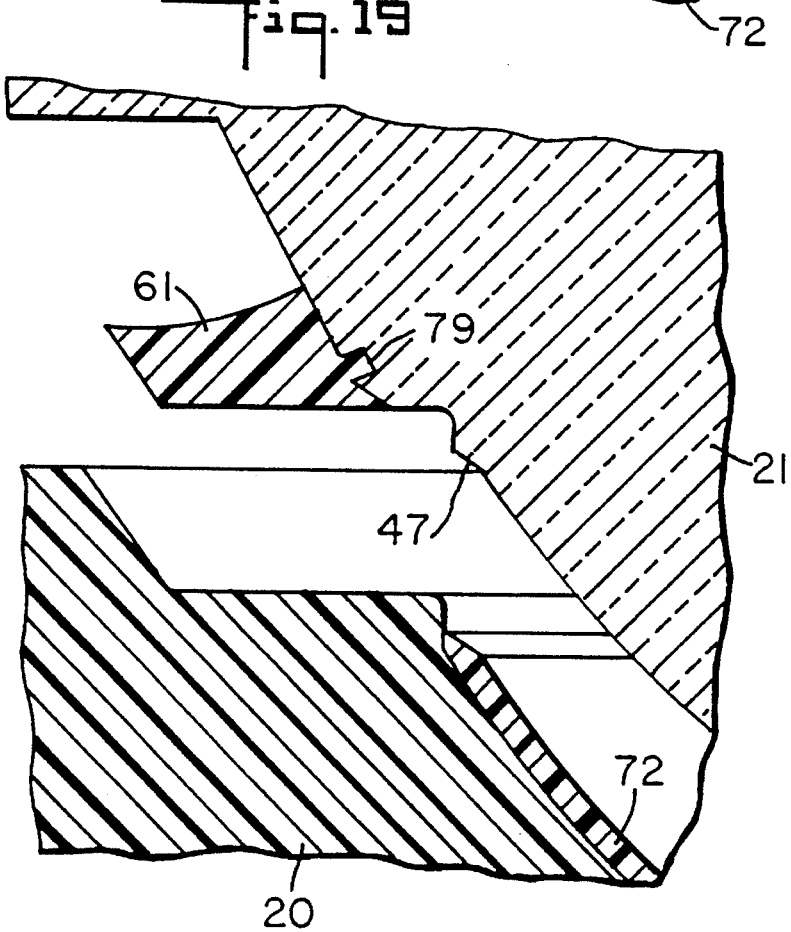

FIGS. 18 and 19 show an alternative configuration for posterior mold 21 which is particularly suited for dry release of lens 72. As shown in FIG. 18, posterior mold 21 includes retaining means for retaining the cured excess 61, the retaining means being in the form of groove 79 at a point adjacent annulus 47 and in the area of receptacle 59. As shown in FIGS. 18 and 19, groove 75 becomes filled with excess lens material while the lens material is in the liquid or semi-liquid state. When the lens material is cured, groove 75 retains the cured excess material thereby to ensure that the excess is retained with the posterior mold 21 during the disassembly step (step S9). Advantageously, this ensures that the cured excess material does not interfere with the lens demolding process, whether that process is performed through hydration or through dry release.

While FIGS. 18 and 19 depict the retaining means as a groove, other forms are possible. Thus, the retaining means may take the form of plural holes in posterior mold 21, or a foot extending from posterior mold 21 into receptacle 59, or simply a roughened surface texture for the posterior mold. Likewise, if it is desired for the cured lens to remain with the posterior mold rather than the anterior mold, then retaining means may be provided on the anterior mold instead.

Figure 20:
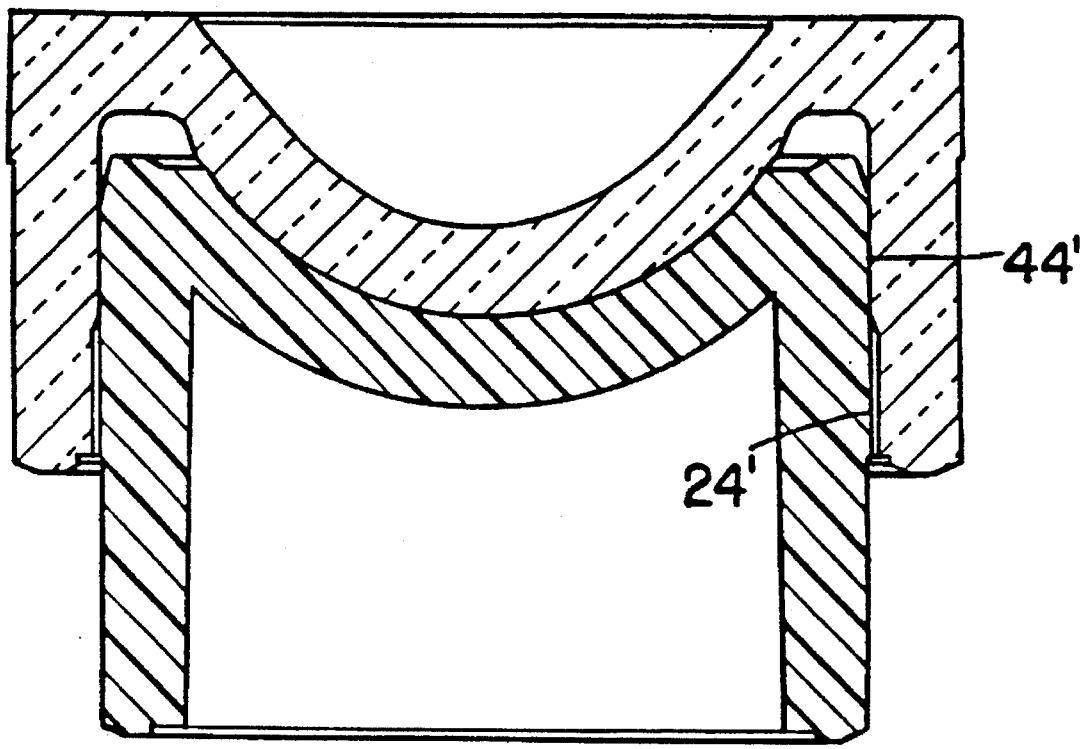
FIG. 20 is a first alternative embodiment of the invention.

FIG. 20 illustrates a first alternative embodiment of the invention in which centering means is provided by vertically extending cylindrical walls 24' and 44'. In all other respects, the embodiment of FIG. 20 is substantially similar to that described above and a detailed discussion thereof is omitted for the sake of brevity.

FIGS. 21 to 24 illustrate a second alternative embodiment of the present invention which uses a taper-lock clamping means wherein it is not necessary to externally clamp the assembled mold during curing. Superficially, the embodiment of FIGS. 20 through 23 resembles that of FIGS. 1 through 19 and accordingly similar reference numbers have been used. Thus, in FIG. 21, posterior mold 121 includes upstanding cylindrical shell 126, top flat 127, the reverse side 129 of posterior mold cavity defining surface 146, shoulder 140, taper 144, reverse 145, posterior mold defining surface 146, and annulus 147. Anterior mold 120 includes cylindrical base 122, tapered head 124, anterior mold cavity defining surface 125, inwardly sloping area 149, collar 150, receptacle forming area 151, rim 152, and right cylindrical wall 154.

In this embodiment, flanges 156 and 157 are provided for posterior mold 121 and anterior mold 120, respectively. Such flanges increase the rigidity of the mold sections and facilitate mechanical manipulation and may, accordingly, also be used in other of the above-described embodiments.

Figure 21:
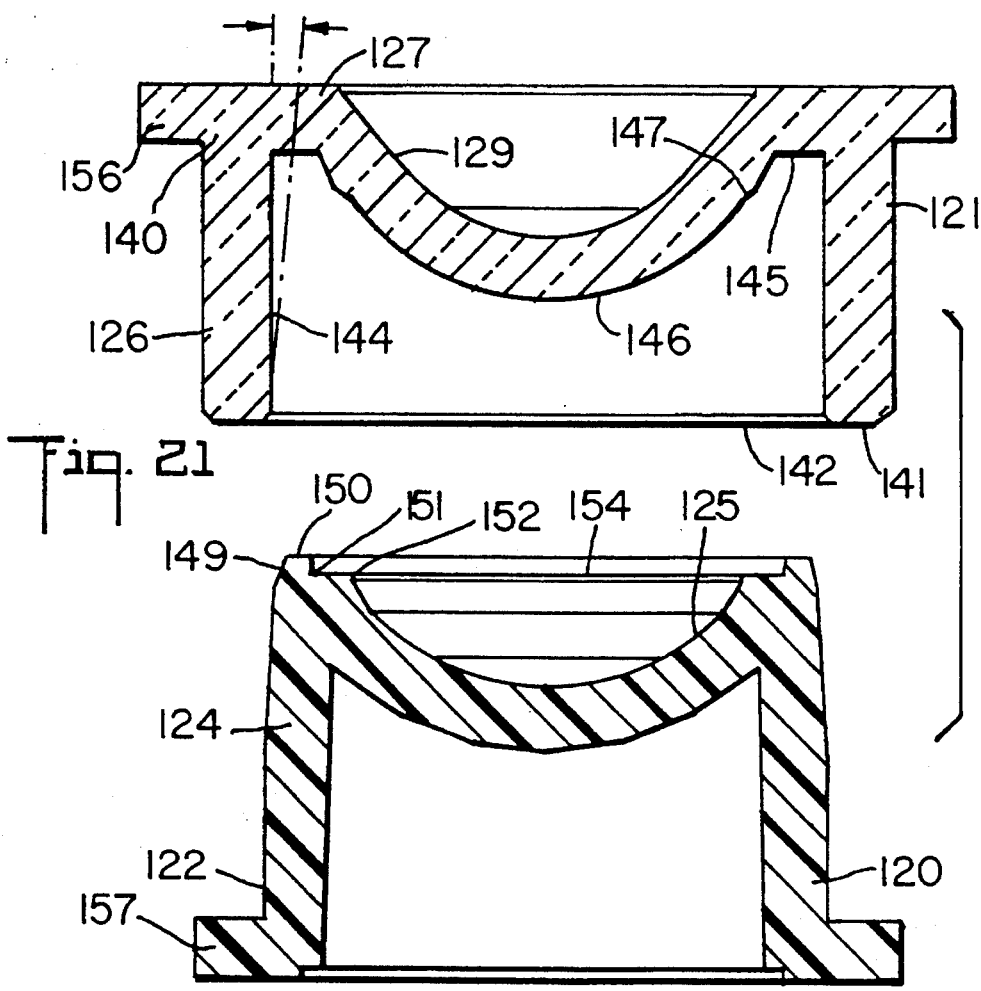
FIGS. 21 through 24 are views for explaining a second alternative embodiment of the invention in which it is not necessary to clamp the mold sections during curing.
Figure 22:
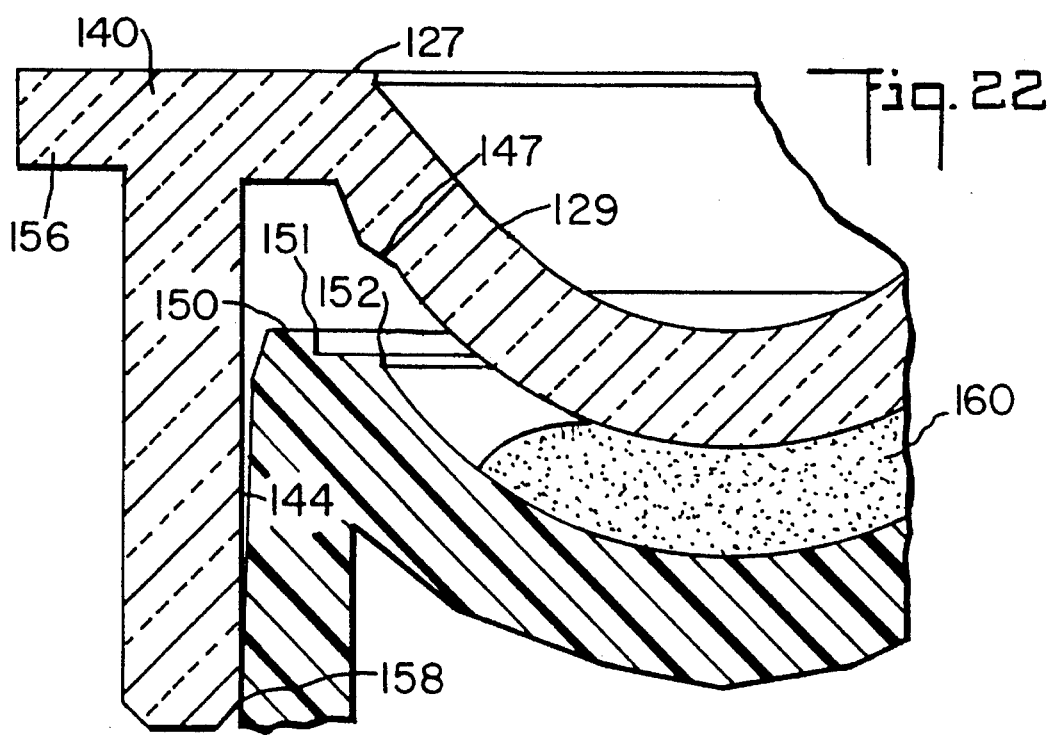
Figure 23:
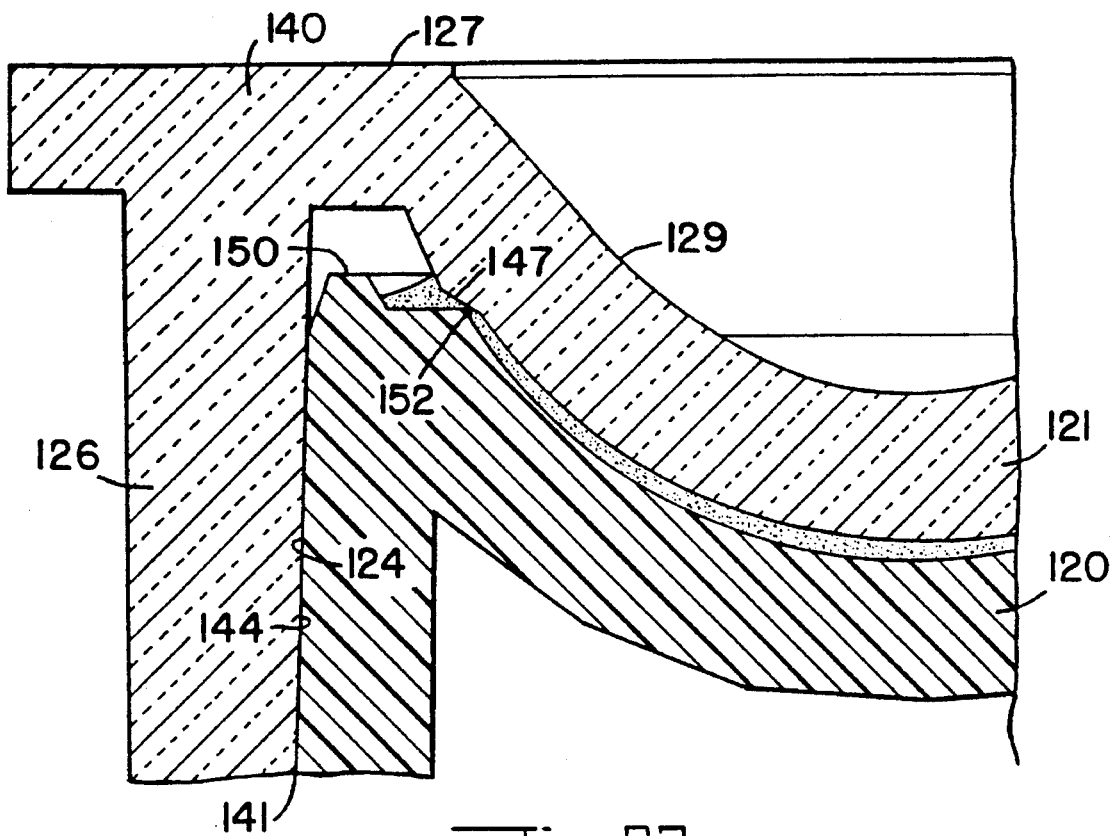
Figure 24:
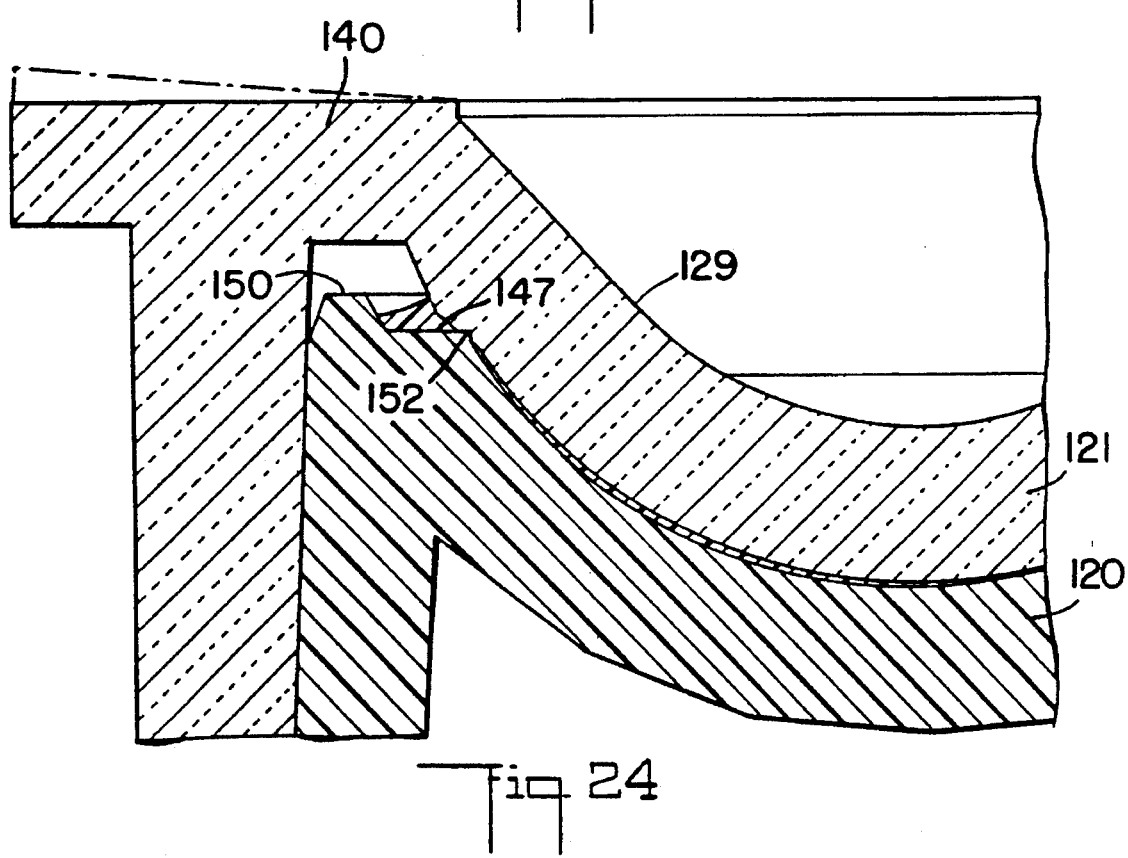

In FIG. 21, the taper angle for tapers 144 and 124, and the relative diameters of the molds in the region of tapers 124 and 144, are selected so that the anterior and posterior molds lock together under action of the taper. Thus, for example, taper 144 is selected at an angle of 2 ½ degrees from vertical while taper 124 is selected at an angle of 3 degrees from vertical. Accordingly, as shown in FIG. 22, the inner extremity of base 141 initially contacts the surface of taper 124 at a point 158 before rim 152 contacts annulus 147. Further downward travel of posterior mold 121 with respect to anterior mold 120 causes the rim 152 to seat against annulus 147 and causes tapers 124 and 144 to lock relative to each other, as shown in FIG. 23. In the preferred embodiment, lock is achieved after a downward travel, or "taper interference," of about 75 microns. The downward and outward compressive forces caused by the locking action of the tapers cause cylindrical shell 126 to pivot outward around shoulder 140 thereby generating a downward sealing force. Straightforward analysis, for example, finite element methods, yields the amount of taper lock compressive force needed to generate a downward sealing force equivalent to that in the case of the first embodiment. In the embodiment illustrated in FIGS. 21 through 24, it has been found that 15 to 25 pounds of closure force yields a 35 pound sealing or clamping force and ensures that the mold sections are locked.

In like manner to that in the first embodiment, the assembled mold with lens material 160 in place is subjected to curing. The combination of the sealing force generated by downward and outward compressive forces from the taper lock with the vacuum force caused by shrinkage is adequate to ensure that rim 152 and annulus 147 are relatively deformed so as to accommodate shrinkage during curing. Accordingly, clamping assemblies may be eliminated although they may, of course, still be used. It has been found that after curing, surface 140 and flange 156 tend to pivot upward around shoulder 140, as shown by the dot, dash line in FIG. 24, in an apparent reaction to the relative deformation of rim 152 and annulus 147.

After curing, steps S9 through S12 of FIG. 7 are performed as before with respect to the first embodiment of the invention whereby a lens having a finished edge with any desired shape may be formed.

The foregoing has been provided so that the nature of the invention may be understood easily. It should, however, be apparent that modifications of the foregoing embodiments may be made without departing from the nature and scope of the invention. For example, it is possible to provide the first described embodiment of the invention with unequal taper angles for tapers 24 and 44 since these tapers are intended simply to provide alignment and centering and not necessarily to provide any taper lock force as in the second alternative embodiment. It is also possible to provide the second alternative embodiment with retaining means such as that described above with respect to the first embodiment. Accordingly, the scope of the invention should not be limited to the specifics described above but instead should be measured with respect to the appended claims.

What is claimed is:

1. A mold assembly for molding lenses comprising first and second mold sections having respective first and second mold cavity defining surfaces forming a mold cavity therebetween, and cooperating centering means provided for each of said first and second mold sections, wherein the first mold cavity defining surface of the first mold section terminates in a deformable, encircling peripheral rim, and the second mold cavity defining surface terminates in a reversely angled deformable mating surface disposed at a diameter corresponding to said peripheral rim.

2. A mold assembly comprising:

an anterior mold having a rigid anterior mold cavity defining surface which terminates in an encircling peripheral rim defined by the corner of a right cylindrical wall and an outwardly extending flange, said anterior mold section further comprising a collar surrounding the peripheral rim and extending from the flange, and a posterior mold having a rigid posterior mold cavity defining surface which terminates in a reversely angled deformable peripheral annulus that is disposed at a diameter that corresponds to said peripheral rim, wherein a rigid mold cavity is defined by said anterior and posterior mold cavity defining surfaces, said mold cavity having a generally spherical surface including a central optical zone.

3. The mold assembly of claim 2, wherein said posterior mold has a hardness of approximately from Shore D 50 to Rockwell M 110 and said anterior mold has a hardness of approximately from Shore D 70 to Rockwell M 120.

4. A mold assembly for molding lenses comprising first and second mold sections having respective first and second mold cavity defining surfaces forming a mold cavity therebetween, wherein the first mold cavity defining surface of the first mold section terminates in an encircling peripheral rim defined by the corner of a right cylindrical wall of the mold cavity and an outwardly extending flange, said first mold section further comprising a collar surrounding the peripheral rim and extending from the flange, and the second mold cavity defining surface terminates in a deformable mating surface disposed at a diameter corresponding to said peripheral rim.

5. A mold assembly according to claim 1, wherein said mating surface is an annulus.

6. A mold assembly according to claim 1, wherein said annulus is radiused.

7. A mold assembly according claim 1, wherein said first mold section is formed of a material different from said second mold section.

8. A mold assembly accordingly to claim 7, wherein said second mold section has a hardness of approximately from Shore D 50 to Rockwell M 110 and said first mold section has a hardness of approximately from Shore D 70 to Rockwell M 120.

9. A mold assembly according to claim 8, wherein said second mold section has a hardness of approximately from Shore D 65 to Rockwell M 65 and said first mold section has a hardness of approximately from Shore D 80 to Rockwell M 110.

10. A mold assembly according to claim 9, wherein said second mold section has a hardness of approximately Shore D 75 and said first mold section has a hardness of approximately Shore D 87.

11. The mold assembly of claim 1, wherein the first mold section has a rigid, generally spherical anterior mold cavity defining surface, and the second mold section has a rigid, generally spherical posterior mold cavity defining surface.

12. A mold assembly according to claim 11, wherein said centering means includes a first cylindrical shell aligned with respect to said rim and a second cylindrical shell engagable with the first cylindrical shell and aligned with respect to said mating surface.

13. A mold assembly according to claim 12, wherein said first and second cylindrical shells are tapered.

14. A mold assembly according to claim 13, wherein said first and second cylindrical shells have the same taper.

15. A mold assembly according to claim 12, wherein the cylindrical shell of one of said first and second mold section has a stepped diameter and the other of said first and second mold sections has an inwardly sloped surface adapted to interact with the stepped diameter.

16. A mold assembly according to claim 1, wherein said first and second mold cavity defining surfaces define a rigid mold cavity having a central optical zone.

17. A mold assembly according to claim 1, wherein one of said first and second mold sections has greater affinity for cured lens forming material than that of the other.

18. A mold assembly according to claim 17, wherein said one of said first and second mold sections having greater affinity is formed from PVC and the other of said first and second mold sections is formed from polypropylene.

19. A mold assembly according to claim 2, wherein said annulus is radiused.

20. A mold assembly according to claim 2, wherein said posterior mold is relatively more deformable than said anterior mold.

21. A mold assembly according claim 20, wherein said posterior mold is formed of a material different from said anterior mold.

22. A mold assembly according to claim 3, wherein said posterior mold has a hardness of approximately from Shore D 65 to Rockwell M 65 and said anterior mold has a hardness of approximately from Shore D 80 to Rockwell M 110.

23. A mold assembly according to claim 22, wherein said posterior mold has a hardness of approximately Shore D 75 and said anterior mold has a hardness of approximately Shore D 87.

24. A mold assembly according to claim 2, further comprising complementary centering means 25. A mold assembly according to claim 24, wherein said centering means includes a first cylindrical shell aligned with respect to said rim and a second cylindrical shell engagable with the first cylindrical shell and aligned with respect to said mating surface.

26. A mold assembly according to claim 25, wherein said first and second cylindrical shells are tapered.

27. A mold assembly according to claim 26, wherein said first and second cylindrical shells have the same taper.

28. A mold assembly according to claim 26, wherein the tapers lock the posterior and anterior molds.

29. A mold assembly according to claim 25, wherein the cylindrical shell of one of said posterior and anterior molds has a stepped diameter and the other of said posterior and anterior molds has an inwardly sloping surface adapted to interact with the stepped diameter.

30. A mold assembly according to claim 2, wherein one of said anterior and posterior molds has greater affinity for cured lens forming material than that of the other.

31. A mold assembly according to claim 30, wherein the other of said first and second mold sections includes retaining means.

32. A mold assembly according to claim 31, wherein said one of said anterior and posterior molds having greater affinity is formed from PVC and the other of said anterior and posterior molds is formed from polypropylene.

33. A mold assembly according to claim 13, wherein the tapers lock the first and second mold sections.

34. The mold assembly of claim 1, wherein the first mold section further comprises confining means for confining excess lens material in a space adjacent to the edge of the mold cavity.

35. The mold assembly of claim 34, wherein the confining means comprises a collar surrounding the rim of the first mold section.

36. The mold assembly of claim 1, wherein the peripheral rim is defined by the corner of a right cylinder wall of the mold cavity and an outwardly extending flange.

37. The mold assembly of claim 36, wherein the first mold section further comprises a collar surrounding the peripheral rim and extending from the flange.

38. The mold assembly of claim 1, wherein the second mold section further comprises a pressure receiving surface for receiving clamping pressure and distributing the pressure uniformly.

39. The mold assembly of claim 1, wherein one of said first and second mold sections includes means for retaining excess cured lens material.

40. The mold assembly of claim 39, wherein one of said first and second mold sections is formed from PVC, and the other of said first and second mold sections is formed from polypropylene.

* * * * *

UNITED STATES PATENT AND TRADEMARK OFFICE
CERTIFICATE OF CORRECTION

PATENT NO. : 5,466,147

DATED : November 14, 1995

INVENTOR(S) : Appleton et al.

It is certified that error appears in the above-indentified patent and that said Letters Patent is hereby corrected as shown below:

In column 12, line 32, after the word "means" insert -- respectively provided for each of said posterior and anterior molds. --

Signed and Sealed this

Twenty-seventh Day of February, 1996

Attest:

BRUCE LEHMAN

*Attesting Officer*     *Commissioner of Patents and Trademarks*